(12) United States Patent
Morgan et al.

(10) Patent No.: US 8,436,855 B1
(45) Date of Patent: May 7, 2013

(54) EFFICIENT ILLUMINATION OF LARGE THREE DIMENSIONAL ENVIRONMENTS

(75) Inventors: David L. Morgan, Leawood, KS (US); Ignacio Sanz-Pastor, San Francisco, CA (US); Javier Castellar, Truckee, CA (US)

(73) Assignee: Aechelon Technology, Inc., San Francisco, CA (US)

( * ) Notice: Subject to any disclaimer, the term of this patent is extended or adjusted under 35 U.S.C. 154(b) by 1387 days.

(21) Appl. No.: 12/033,884

(22) Filed: Feb. 19, 2008

Related U.S. Application Data

(60) Provisional application No. 60/890,596, filed on Feb. 19, 2007.

(51) Int. Cl.
*G06T 15/50* (2011.01)
(52) U.S. Cl.
USPC ............................................ 345/426; 345/419
(58) Field of Classification Search .................. None
See application file for complete search history.

(56) References Cited

U.S. PATENT DOCUMENTS

| | | | | |
|---|---|---|---|---|
| 6,064,393 | A * | 5/2000 | Lengyel et al. | 345/427 |
| 6,271,861 | B1 * | 8/2001 | Sargent et al. | 345/589 |
| 6,515,674 | B1 * | 2/2003 | Gelb et al. | 345/426 |
| 6,707,453 | B1 * | 3/2004 | Rossin et al. | 345/426 |
| 6,735,557 | B1 | 5/2004 | Castellar et al. | |
| 6,747,649 | B1 | 6/2004 | Sanz-Pastor et al. | |
| 7,616,198 | B2 * | 11/2009 | Herken et al. | 345/419 |
| 2002/0036638 | A1 * | 3/2002 | Higashiyama | 345/426 |

* cited by examiner

*Primary Examiner* — Said Broome
(74) *Attorney, Agent, or Firm* — Fenwick & West LLP

(57) ABSTRACT

Efficient determination of illumination over large 3D environments, including shadowing, is provided. Illumination, including shadows, is generated using a raster elevation map by a lighting solver. The lighting solver fetches the raster elevation map for an illumination area of interest at the paging rate and produces an illumination map that is applied to terrain and features by a 3D renderer. The lighting solver updates subsets of the illumination map as necessary to reflect changing illumination or movement of the visual area of interest.

18 Claims, 10 Drawing Sheets

EFFICIENT ILLUMINATION OF LARGE THREE DIMENSIONAL ENVIRONMENTS

CROSS-REFERENCE TO RELATED APPLICATIONS

This application claims the benefit of U.S. Provisional Application 60/890,596, filed on Feb. 19, 2007 and incorporated by reference herein in its entirety.

BACKGROUND OF THE INVENTION

1. Field of the Invention

The present invention relates to the field of computer graphics, specifically to the illumination of large three-dimensional (3D) environments.

2. Description of the Related Art

Illumination has been one of the primary concerns in the field of 3D computer graphics since its inception. In order to realistically render a synthetic scene, one must not only capture the reflective properties of the various materials in the scene, but also characterize the illumination at each visible point in the scene. Ideally, this characterization would model every photon impacting that point in the 3D scene, including each photon's wavelength and direction of travel. To do this rigorously would mean tracing each photon's history, from being emitted by a light source, scattering off and through objects in the scene, until ultimately passing through the lens of the virtual camera. However, modeling the history of each photon in this way is computationally unfeasible at any reasonable rate.

In order to make do with limited computational resources, many approximations have been devised over the years to render scenes with varying degrees of realism. One early approximation was Phong's, which primarily addresses the diffuse and specular properties of materials. More elaborate models were created by Blinn, Cook and Torrance and Kajiya. Ray tracing, introduced by Whitted in its more general form (originally presented by Appel as its simplified ray-casting variant), enabled rendering systems to address global illumination effects, such as inter-reflections and cast shadows. Many ray-tracing algorithms have been devised to trace the paths of photons in the scene, employing carefully crafted random distributions to attempt to capture the relevant photons, and can simulate the many "bounces" that a photon may undergo on its semi-random path from light source to camera. Some ray-tracing illumination engines can even simulate subtle effects such as diffraction and subsurface scattering to achieve the pinnacle of realism.

For outdoor scenes, however, the effects of direct illumination and shadowing dominate the visual experience. This is due to the high intensity of the sun or moon's illumination relative to reflected light, and the fact that outdoor scenes tend to be two-and-a-half-dimensional, meaning there are few areas (such as highway overpasses) that are beneath a structure or natural feature. If, therefore, direct illumination and shadows can be computed efficiently, it is possible to render outdoor scenes with realistic illumination at real-time rates (typically 60 Hz or higher). For many applications, however, outdoor scenes cover very large areas (100,000 $km^2$, for example), and the sheer scale of the environment presents unique challenges to efficient illumination.

Direct illumination is a fairly simple problem that scales linearly with the resolution of the display device, and therefore needs no special consideration for large environments. For visual simulation, Phong's approximation is usually sufficient. For sensor simulation (such as night vision goggles (NVGs) and various Infra-Red sensors), a different algorithm is merited (see Castellar et al, U.S. Pat. No. 6,735,557, incorporated here by reference), but the principles are the same: parallel light rays travel directly from a celestial light source to the terrain or other feature and are absorbed, and/or reflected.

Shadowing, however, is a much more computationally intensive problem, because, for each point in the scene, there are many points along the ray to the light source that may or may not be filled by terrain or other feature (such as a mountain). Every one of these points must be tested to see whether or not it occults the light source for the point whose illumination is in question. Moreover, the complexity of the problem increases as the elevation angle of the sun/moon decreases, because the rays travel greater horizontal distances before rising above the tallest features in the scene.

It should be noted that, in outdoor scenes, the dominant occluder is the terrain itself. Shadows cast by the terrain can cover very large areas of terrain, and also features such as trees and man-made structures. In contrast, features cast shadows on small, localized areas. This dichotomy suggests that a hybrid approach to shadow generation, rather than a single global algorithm may be appropriate.

Shadows enhance the realism of visual simulations, and are critical to accurate simulation of night vision goggles. This is due to the great difference in magnitude between moonlight and starlight, versus the difference between direct sunlight and sun illumination scattered through the atmosphere (the blue sky). Shadows can also enhance infrared simulation, in which latent heat stored by the terrain is the source for most of the long-wave IR photons entering the sensor. Areas of terrain that were in shadow for much of the afternoon will be cooler than those in direct sunlight, even at midnight.

Regardless of the shadow algorithm employed, it is important to distinguish between dynamic and static shadowing systems. In a dynamically shadowed environment, the shadows are computed regardless of the position of the light source (e.g. time of day and year) and the position or orientation of movable objects in the scene. In a statically shadowed environment, shadows are computed ahead of time, for a single (or a small number of) light position, and those shadows will be incorrect for any other time of day or positioning of objects and structures. For some applications (such as an architectural walk-through), static shadows may be adequate. Static shadows have the advantage that much more computational power can be brought to bear, as they are computed in an off-line process as part of environment creation.

A variety of shadowing algorithms have been employed for real-time applications, each with its own strengths and weaknesses. The predominant algorithm is known as shadow mapping, introduced by Williams in 1978. In shadow mapping, the 3D scene is rendered from the camera's perspective, and the depth (Z) buffer is stored in a texture map known as the shadow map. When rendering the scene from the camera, the distance from each rendered point in the scene to the light is computed, and if it is greater than the corresponding value in the shadow map, that point is considered to be in shadow. Shadow mapping is useful in that it allows objects to self-shadowed, meaning one part of an object can cast a shadow on another part of the same object. Over large areas, shadow mapping suffers from the limited precision of depth buffers and the limited size of the texture maps. Certain techniques have been recently presented to enhanced large area rendering, involving use of perspective shadow maps to optimize the texel density of the depth map close to the eyepoint, or combining multiple depth maps to cover regions of a scene.

Shadow mapping usually requires careful application of a bias term in order to prevent points in the mesh from shadowing themselves. Setting this term can be very subjective and often cannot be constant over the shadow map area.

Another popular algorithm is known as shadow volumes, introduced by Crow in 1977. In this algorithm, special geometry is constructed by projecting rays from the light source, through the each vertex of the object in question, in order to construct a mesh that contains the volume of space in which the light is occulted by that object. Points inside the volume are in shadow, points outside are lit. Most shadow volume real time implementations make use of the stencil planes in graphics hardware systems to build a mask to keep track of shadowed and lit regions, by drawing the front facing and back facing faces of the volume mesh on different passes, and using stencil operations to count how many of each affect each rendered pixel. If the number of front and back facing passes matches, the pixel is lit, if they differ, it is in shadow.

An emerging class of algorithm involves defining a parametric equation such as a spherical harmonic at points in the environment as a preprocessing step, which essentially characterizes what portion of the sky can be seen from each point. Pre-computed Radiance Transfer, presented by Sloan et al in 2002, is the best known example. PRT is an optimization of a technique known as horizon mapping, introduced originally by Max in 1988. This approach produces high-quality illumination at real-time rates, and is applicable to large areas. The preprocessing step is very computationally intense, however, and the parameters can require a great deal of extra storage in the 3D database and corresponding increased bandwidth to transmit them to the graphics engine.

One of the oldest algorithms for shadow computation is light source ray-casting, in which a ray is traversed for each point whose occlusion is in question towards the light source, and objects that may intersect the ray are tested for intersections. A particularly simple form of light source ray casting is ray casting against a height map (a regular grid of height values), since only comparisons of post values against the height of the ray at a given location are needed, avoiding the need for generating and testing actual polygons for ray intersections. While the math required for testing ray intersections is very simple, it has not historically been practical for real-time application over large areas due to the fact that the number of rays and potential intersections both increase geometrically with the size of the environment. Also, efficient shadow-casting requires that the environment database be spatially organized in order to limit intersection tests to objects in the path of the ray. Otherwise, the ratio of relevant to wasted intersection tests rapidly approaches zero.

In the field of terrain rendering there have been many different algorithms that optimize the processing by focusing on specific characteristics of terrain rendering when compared to the general case. One of such methods is the one introduced by Sanz-Pastor and Morgan (U.S. Pat. No. 6,747,649), incorporated here by reference.

It is also common practice to capture the illumination for a given object on a scene on a texture map, separating the actual surface detail of the object from the lighting contribution of the scene in order to achieve per pixel lighting, replacing the per-vertex lighting computations with a modulation map that controls the brightness of the object. Light maps can be pre-computed, or generated dynamically. Either multiple rendering passes or multi-texturing can be used to combine the surface appearance and lighting information from the light map in real time rendering, allowing per-pixel lighting effects with minimal cost, or the lighting contribution can be incorporated into the surface texture and applied as a single map to the object.

Shadowing effects can be also incorporated onto a light map, rendered using any of the previously described algorithms, but applying the shadowed light map to the object geometry can be challenging in many cases. Due to its "2.5D" nature and the distance between the illuminated terrain and the sun or moon illuminating it, terrain is quite amenable to use of per pixel illumination via light maps with a simple planar projection. A detailed description of both shadow casting of height maps and terrain light mapping was presented by Marghidanu in 2002, but both techniques have been used extensively prior to his article. Texture based lighting for sensor rendering on a real time basis was introduced by Castellar et al, including both a per texel computed illumination component as in-band radiance, and a terrain shadow coverage component computed at a higher spatial frequency than the underlying polygon mesh the composite light map is applied to.

An important concept that has been alluded to above is that of computational rates. There are several rate domains in which illumination can be calculated. One such domain is pre-processing, in which shadows are generated prior to real-time simulation, as in static shadows. Another such domain is the per-vertex rate, in which shadows are computed for each vertex in a mesh, and interpolated across each triangle, as in certain parametric algorithms. The highest shadow rate would be to compute the shadows per-pixel, as in shadow mapping with a sufficiently high resolution shadow map that is regenerated every frame (e.g. $\frac{1}{60}^{th}$ of a second). Both vertex and pixel rate shadow algorithms essentially regenerate all the shadows every frame, which may be unnecessary in many scenes.

SUMMARY OF THE INVENTION

The present invention enables efficient determination of illumination over large 3D environments, including shadowing. Illumination (including shadows) is generated using a raster elevation map by a Lighting Solver. The Lighting Solver fetches the raster elevation map for an Illumination Area of Interest at the paging rate and produces an Illumination Map which is applied to terrain and features by a 3D Renderer. The Lighting Solver updates subsets of the illumination map as necessary to reflect changing illumination or movement of the Visual Area of Interest.

For 'Out The Window' visual simulation, the Lighting solver generates a Light Map with per texel lighting in accordance to the surface normal and illumination source incident angle.

For NVG simulation, the Lighting Solver generates an Irradiance Map which is combined with an in-band Reflectance Map by the 3D Renderer to correctly calculate Radiance, as perceived by the NVG's photomultiplier. For IR simulation the Lighting Solver generates a Temperature Map, which is combined with black-body response coefficients to form an Emissance value, used to correctly calculate Emitted Radiance, as perceived by the IR sensor. Other types of sensors combine both the reflective contribution and the emissive component into an aggregate sensed image.

In reflective simulations (e.g. visual, NVG, and midwave IR) responsive to a celestial light source, features such as trees and buildings apply just the shadow component of the Illumination Map, and compute direct illumination using well-known methods such as Phong shading. In one embodiment, the Illumination Map is offset proportional to the height above terrain of the feature geometry, in order to correctly simulate tall features, which may only be partially in shadow due to their height.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 2:
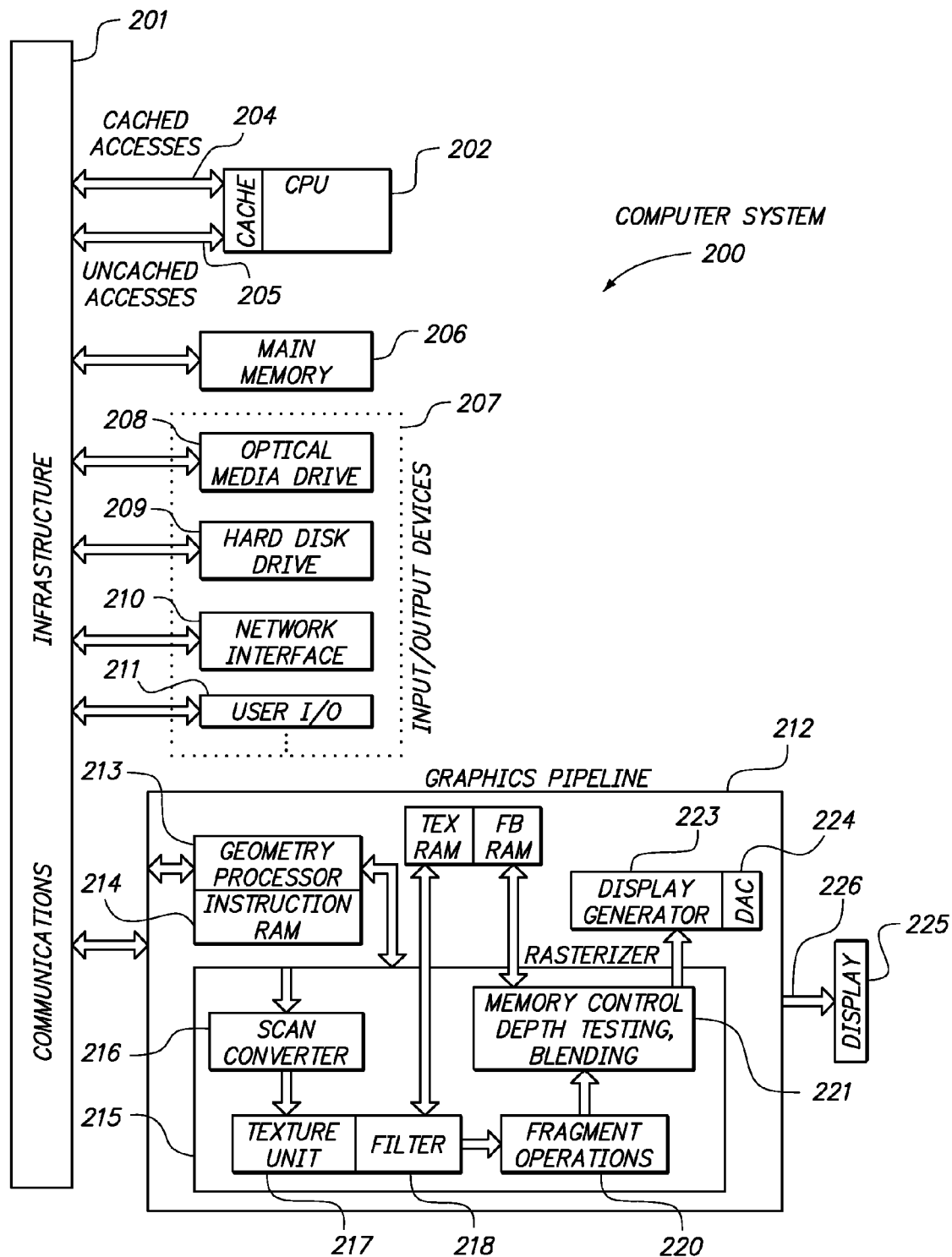
FIG. 2 illustrates a system equipped with a three-dimensional graphics pipeline in accordance with an embodiment of the present invention.

FIG. 2 depicts an example of a computer system 200 equipped with a three-dimensional graphics pipeline 212 in accordance with an embodiment of the present invention. The graphics pipeline is one embodiment of a three-dimensional renderer or a real-time three-dimensional renderer. Computer system 200 may be used to render all or part of a scene mapped in accordance with the present invention. This example computer system is illustrative of the context of the present invention and is not intended to limit the present invention. Computer system 200 is representative of both single and multi-processor computers.

Computer system 200 includes one or more central processing units (CPU), such as CPU 202, and one or more graphics subsystems, such as graphics pipeline 212. One or more CPUs 202 and one or more graphics pipelines 212 can execute software and/or hardware instructions to implement the graphics functionality described herein. Graphics pipeline 212 can be implemented, for example, on a single chip, as part of CPU 202, or on one or more separate chips. Each CPU 202 is connected to a communications infrastructure 201, e.g., a communications bus, crossbar, network, etc. Those of skill in the art will appreciate after reading the instant description that the present invention can be implemented on a variety of computer systems and architectures other than those described herein.

Computer system 200 also includes a main memory 206, such as random access memory (RAM), and can also include input/output (I/O) devices 207. I/O devices 207 may include, for example, an optical media (such as DVD) drive 208, a hard disk drive 209, a network interface 210, and a user I/O interface 211. As will be appreciated, optical media drive 208 and hard disk drive 209 include computer usable storage media having stored therein computer software and/or data. Software and data may also be transferred over a network to computer system 200 via network interface 210.

In one embodiment, graphics pipeline 212 includes frame buffer 222, which stores images to be displayed on display 225. Graphics pipeline 212 also includes a geometry processor 213 with its associated instruction memory 214. In one embodiment, instruction memory 214 is RAM. The graphics pipeline 212 also includes rasterizer 215, which is communicatively coupled to geometry processor 213, frame buffer 222, texture memory 219 and display generator 223. Rasterizer 215 includes a scan converter 216, a texture unit 217, which includes texture filter 218, a fragment shader unit, fragment operations unit 220, and a memory control unit (which also performs depth testing and blending) 221. Graphics pipeline 212 also includes display generator 223 and digital to analog converter (DAC) 224, which produces analog video output 226 for display 225. Digital displays, such as flat panel screens can use digital output, bypassing DAC 224. Again, this example graphics pipeline is illustrative of the context of the present invention and not intended to limit the present invention.

The present invention, when applied to a three-dimensional scene that includes terrain, provides a high fidelity simulation of illumination including dynamic shadows. Shadows are efficiently generated for large areas using a parallel light source ray-casting algorithm, at paging rates. In visual and sensor simulations, the three-dimensional environment is typically larger than the maximum area of regard, and as the viewer roams through the environment, the area of regard also roams, and new data is filled in at the outer edges of the area of regard in the direction the viewer is headed, and old data is discarded at the opposite edges. This well-known process is called paging, and it is at this rate (processing data as it is filled in) that shadows are generated.

Figure 1:
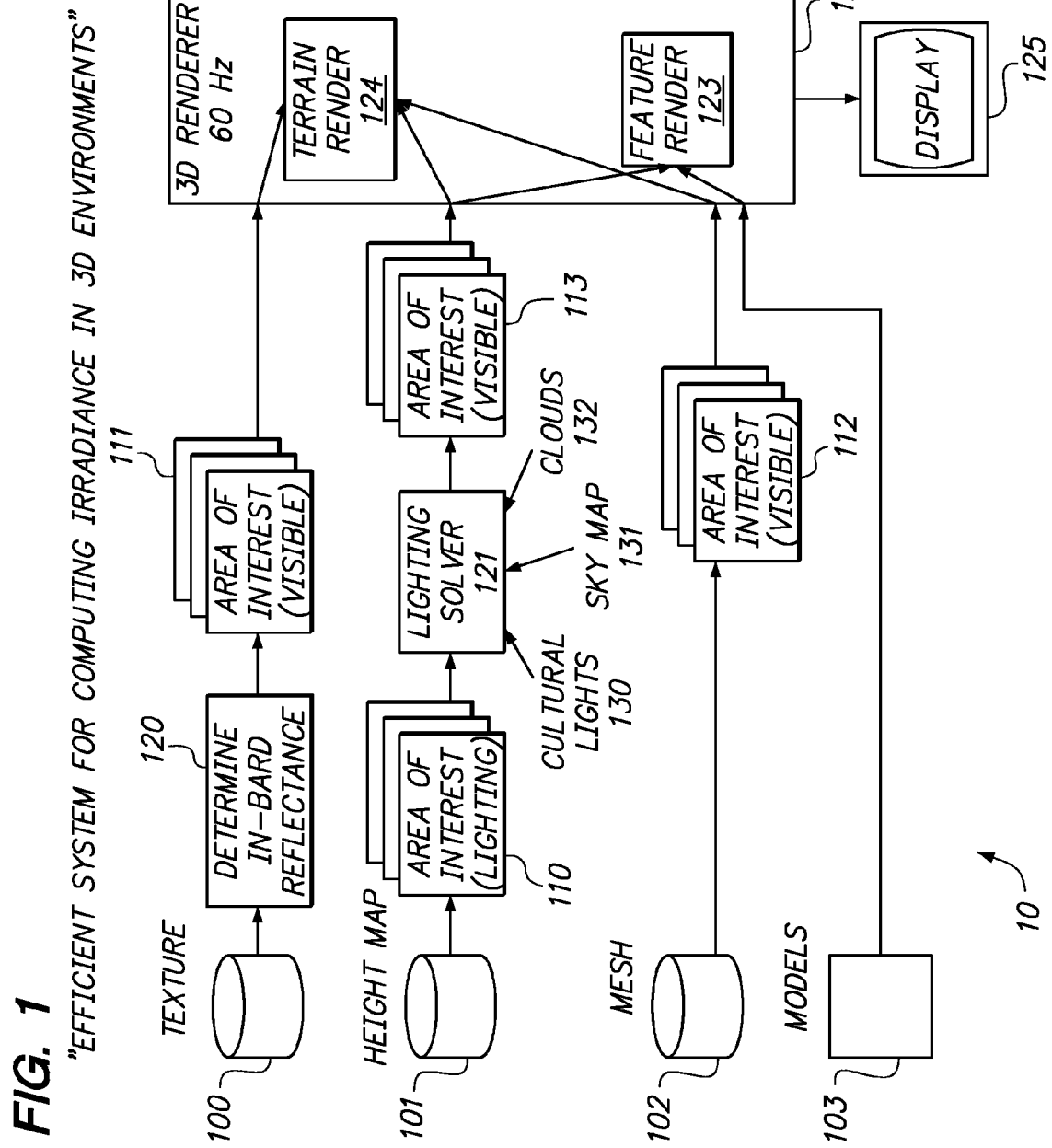
FIG. 1 illustrates a system for determining illumination in accordance with an embodiment of the present invention.

FIG. 1 illustrates a system 10 for determining illumination in accordance with an embodiment of the present invention. A 3D environment is rendered by 3D Renderer 122 and displayed on Display 125. The 3D environment includes terrain and features (e.g. buildings, trees, vehicles), and those skilled in the art will recognize that the scene can contain other elements as well. The environment is stored in Database 100-103. Data is paged from the database into visible area of interest buffers 111, 112, 113, which are memory buffers referenced by 3D renderer 122 during each frame rendering cycle. The desired coverage of different areas of interest is not the same for each case.

Terrain Texture database 100 includes terrain texture, which may be color imagery for a visual simulation, or other encoding (e.g. materials, radiance, or other sensor-relevant data) appropriate for sensor simulation. For visual simulations, Terrain Texture 100 is in one embodiment derived from photographs taken at noon. In sensor simulations, Reflectance Calculator 120 performs the step of converting sensor texture 100 into sensor-specific values that capture the spectral response of the sensor being simulated. For systems where sensor texture 100 is already sensor-specific or for visual simulation, Reflectance Calculator 120 is bypassed. Paging of Terrain Texture 100 and, if applicable, Reflectance Calculator 120, into Texture Map/Area of Interest 111 is driven by viewpoint data using algorithms known to those skilled in the art.

Terrain Mesh 102 is paged into Area of Interest Buffer 112 for rendering by 3D Renderer 122. Terrain Mesh 102 may be a triangle mesh, a displacement map, or other data structure suitable for terrain rendering, which may contain multiple levels of detail (LODs).

Models 103 are also supplied to 3D Renderer 122. Models may be static, paged, procedurally generated, or defined according to other means. As discussed here, models are considered to be terrain-based, meaning they are on or near the ground (trees, buildings, vehicles, ships), in contrast to airborne models.

Height Map 101 is a raster encoding of the terrain elevation. In one embodiment, Height Map 101 is stored as raster elevation in the database, and its spatial resolution in most cases does not match the resolution of the terrain. Alternatively, Height Map 101 may be generated on the fly by rasterizing Terrain Mesh 102. The Height Map is stored in one or more LODs, in one embodiment as a pyramidal structure. Data from Height Map 101 is paged into Lighting Area of Interest 110, which covers a larger area than the visible scene, because shadows may be cast from mountains outside the visible scene onto visible terrain.

Lighting Solver 121 accesses Height Map Buffer 110 to generate lighting, including shadows, to be applied to Terrain and ground-based features. Lighting Solver 121 applies light sources Sun/Moon/Sky 131 and, in one embodiment, cultural lights 130 to Height Map 110 to generate Light Map 113. Light Map 113 is in the same geographic projection as Height Map 101, which is in one embodiment a top-down, orthographic projection of the visible area of interest. Light Map 110 in one embodiment contains multiple components, including an Irradiance (illumination) component for use by Terrain Renderer 124) and an Occultation component for use by Feature Renderer 123. Light Map 113 is accessed by 3D Renderer 122, which renders the scene at real-time rates.

3D Renderer 122 contains Terrain Renderer 124 and Feature Renderer 123. Renderers 123 and 124 may be implemented as dedicated hardware, as software executing on CPU 202, or as vertex/fragment shader instructions executed on graphics pipeline 212. Terrain Renderer 124 combines Terrain Mesh 112, Terrain Reflectance Texture 111, Light Map 113, and optionally weather and special effects to produce the rendered terrain, which is stored in Frame Buffer 222 for output on Display 125. Terrain Renderer 124 utilizes the Irradiance component of Light Map 113.

Feature Renderer 123 combines models 103 (which may contain geometry, texture maps, and other associated model data) with Light Map 113, and optionally weather and special effects to produce the rendered features, which are stored in Frame Buffer 222 for output on Display 125. Feature Renderer 123 utilizes the Occultation component of Light Map 113. The Occultation values are used to modify the conventional lighting algorithm (e.g. Phong illumination) that would otherwise be applied to the features. For the example of Phong illumination, pixels that are fully occulted would be lit by only the Ambient component, and the Diffuse and Specular contributions would be zero. For partially occulted pixels, the diffuse and specular contributions are in one embodiment scaled by the occultation value. Note that occultation of models affects the primary (celestial) light sore, while local lights such as landing lights or flares add light independent of whether a point is occulted.

Figure 3:
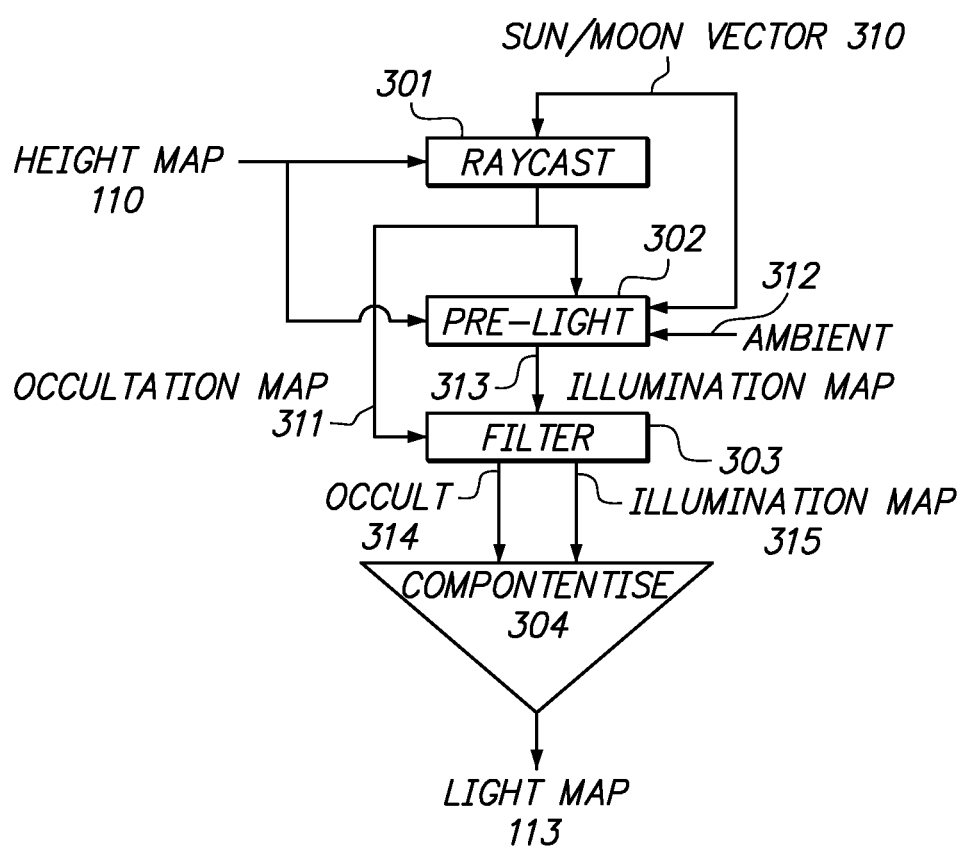
FIG. 3 illustrates operation of a lighting solver subsystem in accordance with an embodiment of the present invention.
Figure 5:
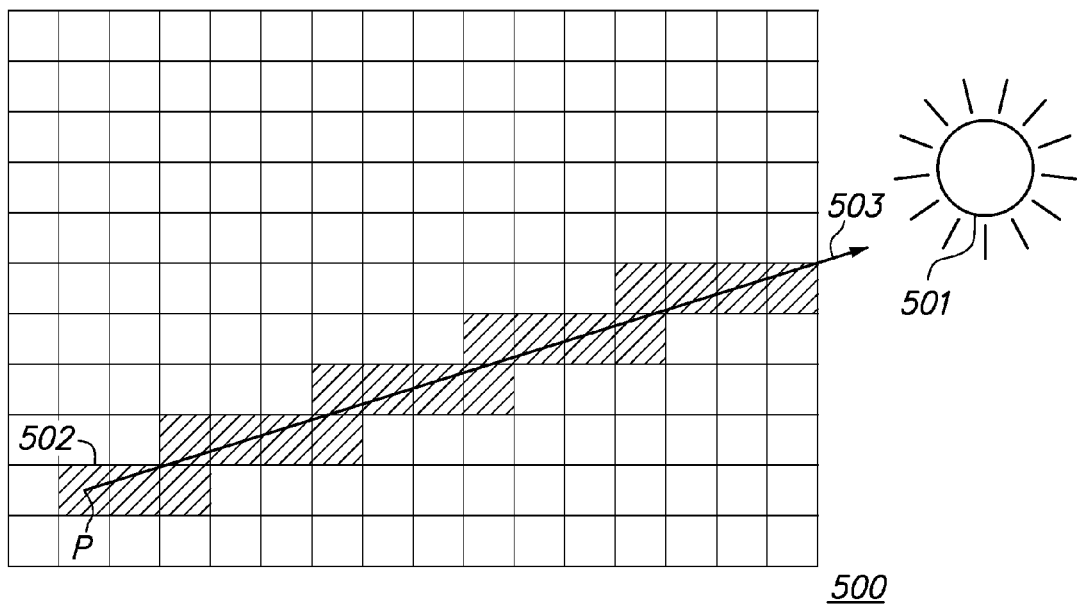
FIG. 5 illustrates the traversal of a ray through a raster elevation map.

FIG. 3 illustrates the data path of Lighting Solver 121. Height Map 110 is accessed by the Light Source Ray Caster 301, which generates Occultation Map 311 by traversing rays parallel to Sun/Moon Vector 310. The Light Source Ray Caster employs well-known algorithms for traversing rays through raster data, such as that disclosed by Marghidanu. FIG. 5 provides an example traversal of a ray originating at element P of a raster height map. The height at each of the shaded elements is compared to the height of ray 503 at the point where the ray is within the boundaries of the element, and if the element's height is greater than the ray height, element P is considered to be in shadow. Those of skill in the art will appreciate that other algorithms can be used to implement the shadow computation operation.

Lighting Unit 302 accesses Height Map 110, Sun/Moon Vector 310, and Occultation Map 311, as well as lighting parameters 312 including such attributes as ambient and diffuse intensity, and utilizes a well-known lighting model (such as Phong) to create Illumination Map 313. Lighting Unit 302 utilizes Height Map 110 to determine the normal vector for each element of Illumination Map 313 as disclosed by Castellar.

In one embodiment, both Occultation Map 311 and Illumination Map 313 are then processed by Filter Unit 303, which filters the occultation and illumination values using data from neighboring texels in order to smooth the results. The filtered Occultation Map 314 and Illumination Map 315 are then combined by Componentization Unit 304 into Light Map 113.

In one embodiment, units 301-304 are implemented as a parallel program operating on a SIMD (Single Instruction, Multiple Data) processor, such as a DirectX Shader Model 3.0 compliant graphics processor. At this point, other scene lighting elements can be included in the light map in addition to direct sun or moon lighting, such as pre-computed shadows from clouds or local lighting effects for other lights on the scene, such as the effect of street lights or floodlights on the terrain directly underneath them—as elements added to 313.

Figure 4:
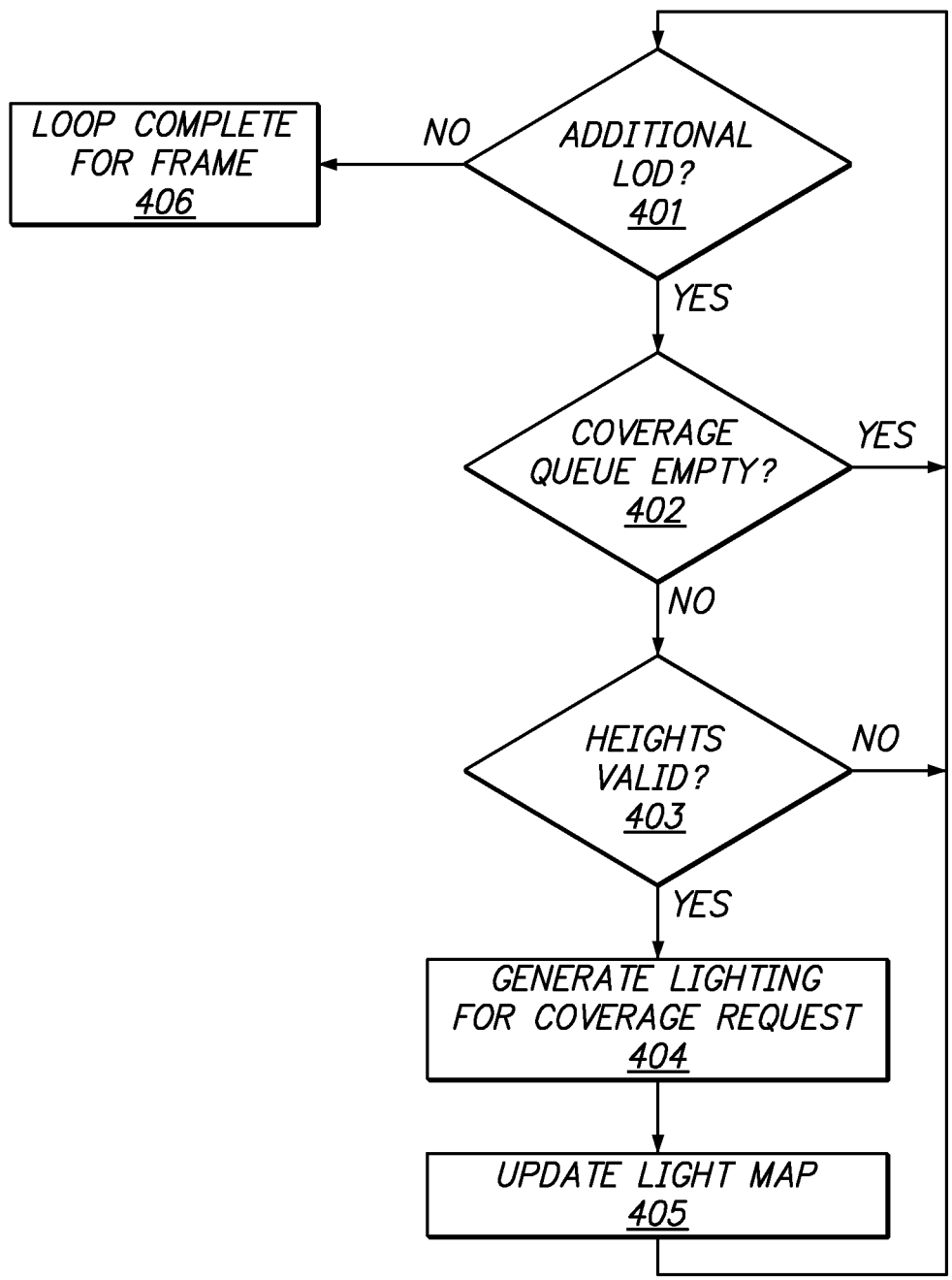
FIG. 4 illustrates a process for generating lighting for a coverage area by a lighting solver in accordance with an embodiment of the present invention.

FIG. 4 illustrates the control flow governing operation of Lighting Solver 121 in accordance with an embodiment of the present invention. Loop 401 iterates over the shadow LODs, if more than one LOD is present. For example, if shadows near the viewer are being rendered at 4-meter resolution and shadows far from the viewer are being rendered at 32-meter resolution, then Loop 401 will iterate over two levels of detail.

Queue Test 402 checks the Coverage Queue for the LOD being considered for pending Coverage Requests. Coverage Requests are generated by the terrain paging algorithm to cause the Lighting Solver to generate lighting for subsets of Light Map 113, which are generally at the leading edges of the Area of Interest. If the Coverage Queue for the LOD in question is empty, control returns to the LOD loop to test another LOD.

Valid Test 403 checks to see if Height Map 110 is valid for the LOD and Coverage Area in question. The Height Map may not yet contain data necessary for fulfilling the pending Coverage Request due to limited paging rates and large volumes of data required for rendering shadows. In that case, control returns to the LOD loop to test another LOD. When Valid Test 403 is satisfied, the Lighting Solver generates lighting for the requested area in step 404, and then the affected portion of Light Map 113 is updated with the rendered data.

Figure 6:
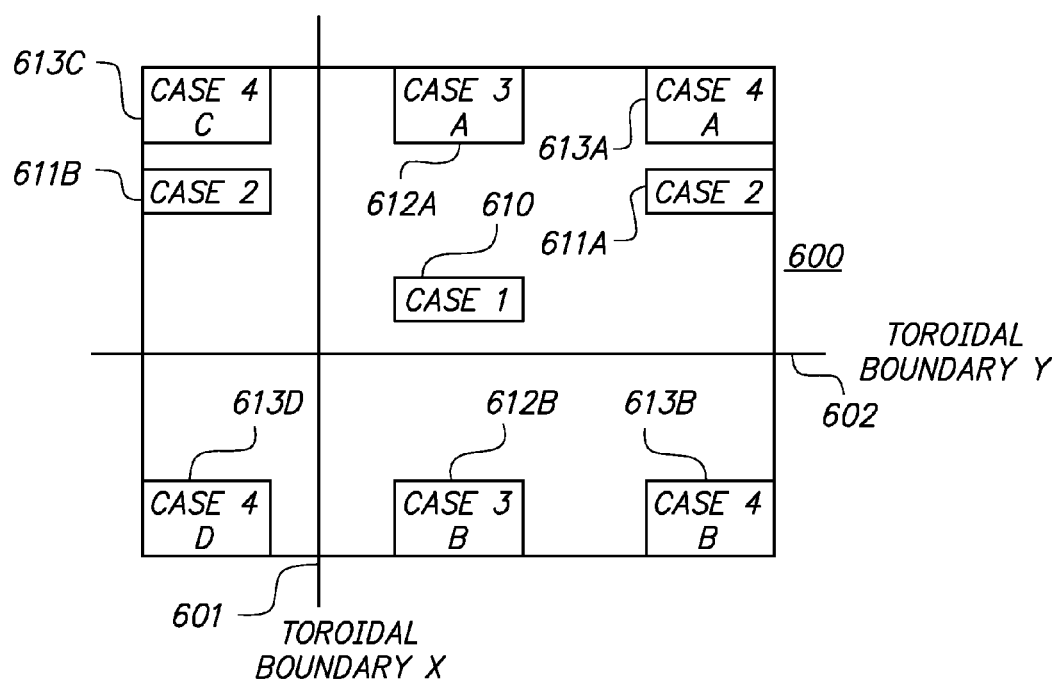
FIG. 6 illustrates several cases that can occur when updating a toroidal buffer in accordance with an embodiment of the present invention.

In one embodiment, Light Map 113 is stored in a toroidally addressed texture map. Those skilled in the art will recognize the utility of toroidal addressing in paging applications. Depending on the size of the covered area and the location of the area of interest in the overall database, step 405 may comprise one, two, or four separate updates. FIG. 6 provides an illustration of the possible cases.

FIG. 6 illustrates example buffer 600 with toroidal boundaries 601 and 602. Regions 611, 612, 613, and 614 are all rectangles in continuous space, but are subdivided into one, two, two, and four regions, respectively in the example buffer.

Figure 7:
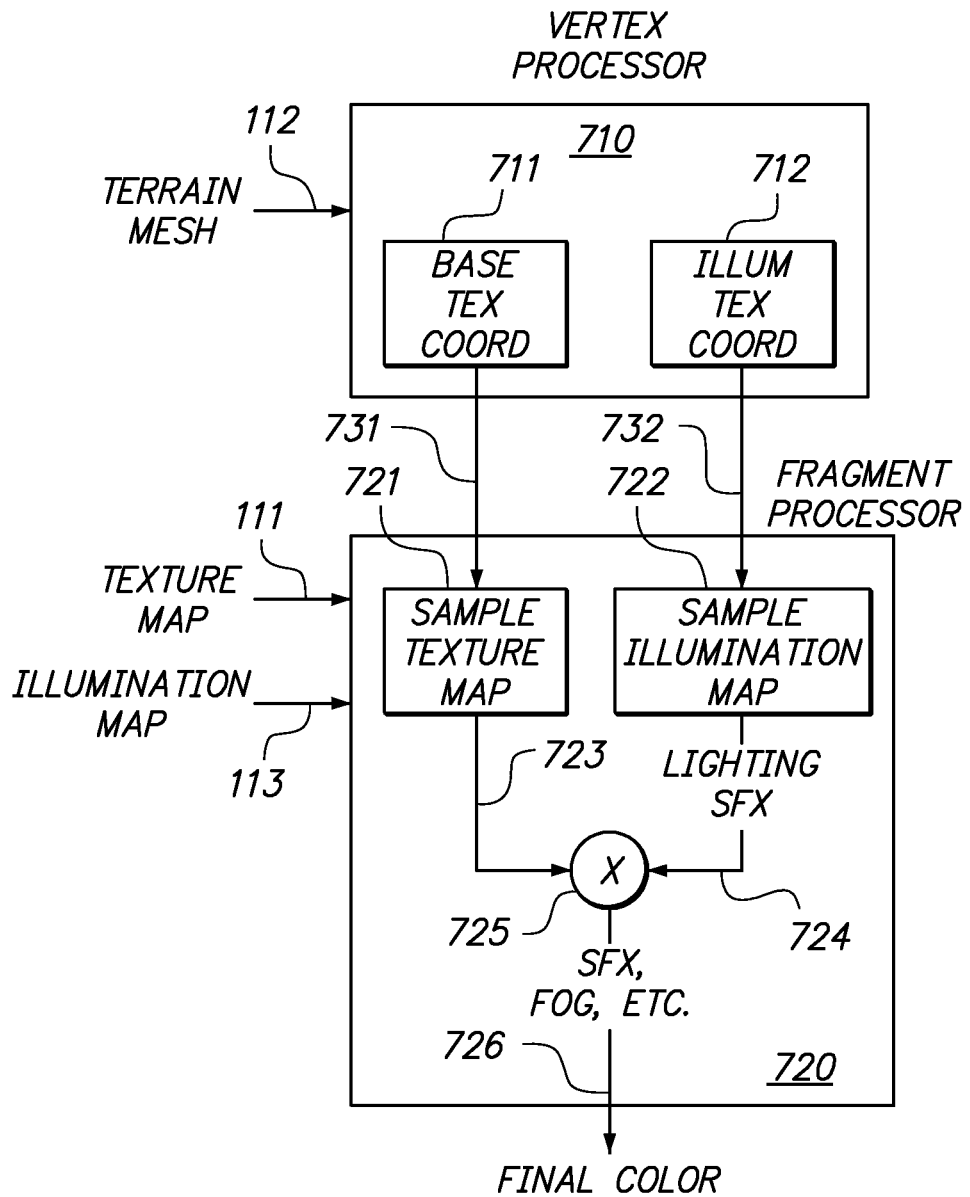
FIG. 7 illustrates a terrain rendering subsystem in accordance with an embodiment of the present invention.

FIG. 7 illustrates components of Terrain Renderer 124 that are relevant to lighting. Terrain Renderer 124 may additionally contain other components that are particular to the specific terrain rendering algorithm employed. During the course of processing terrain vertices, Vertex Processor 710, which in one embodiment forms part of Geometry Processor 213, emits texture coordinates 731 and 732 for addressing the base and illumination textures, respectively. Texture coordinate generators 711 and 712 may simply pass on texture coordinates from the mesh, apply a texture matrix, generate a texture coordinates from vertex positions, or other means. In one embodiment, the same texture coordinates are used to address both textures. Texture coordinates 731 and 732 are interpolated across each triangle as part of the rasterization process (not shown), and Fragment Processor 720 receives these interpolated values for each fragment (pixel) that it processes. Samplers 721 and 722 look up texture and illumination values, which are combined by multiplier 725 to produce the final terrain color 726, which is stored in Frame Buffer 222.

As indicated in FIG. 7, lighting special effects such as landing lights, flares and other effects may modify the illumination value 724, and other special effects and weather, such as fog, may modify terrain color 726. FIG. 7 should not be construed as limiting the various terrain rendering algorithms or spectrum of special effects.

Figure 8:
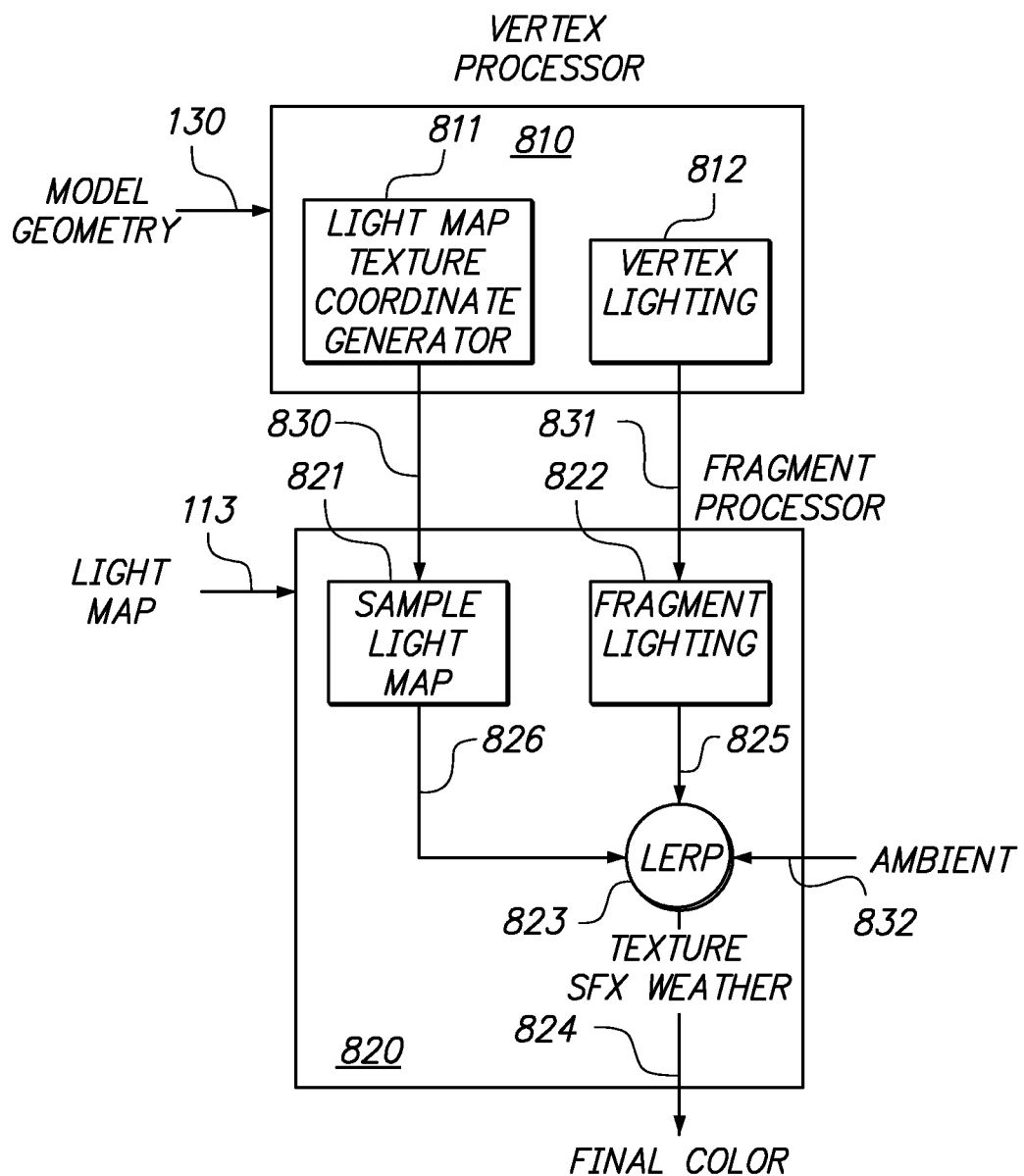
FIG. 8 illustrates a feature rendering subsystem in accordance with an embodiment of the present invention.

FIG. 8 depicts components of Feature Renderer 123 that are relevant to lighting. Feature Renderer 123 may contain other components that are particular to the specific terrain rendering algorithm employed. During the course of processing feature vertices, Vertex Processor 810, which forms part of Geometry Processor 213, emits texture coordinates 830 for addressing the light map texture. In one embodiment, Light Map Texture Coordinate Generator 811 multiplies eye-space vertex coordinates by a texture matrix to create light-map-space texture coordinates. In alternative embodiments, other techniques for generating light-map-space texture coordinates are used. Texture coordinate 830 is interpolated across each triangle as part of the rasterization process (not shown), and Fragment Processor 820 receives these interpolated values for each fragment (pixel) that it processes. Sampler 821 looks up light map values, and the occultation component 826 causes the results of the normal vertex and/or lighting values to be interpolated against the Ambient Color 832 to produce the final color 824, which is stored in Frame Buffer 222.

As indicated in FIG. 8, texture mapping, special effects, and weather effects may modify Final Color 824 before writing to Frame Buffer 222. FIG. 8 should not be construed as limiting the various feature rendering algorithms or spectrum of special effects.

Figure 9:
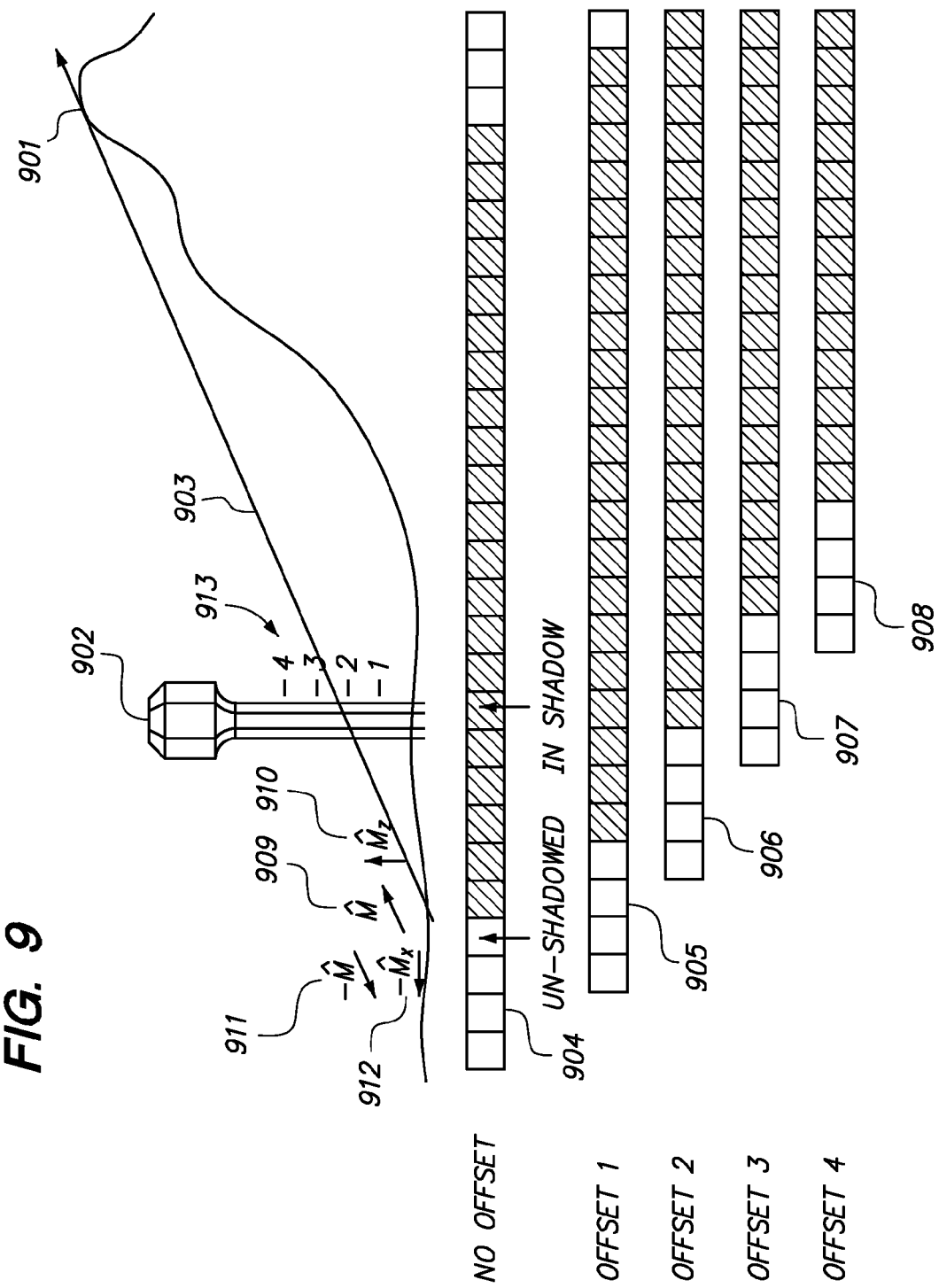
FIG. 9 is an example scene illustrating the application of a light map with height above terrain offset in accordance with an embodiment of the present invention.

For sufficiently tall features, simply overlaying Light Map 113 over the feature will produce erroneous results, as shown in FIG. 9. To precisely simulate shadows over such features, additional rays would need to be cast from points on the feature model in order to accurately determine occultation. However, an approximation that yields reasonable values is to apply the light map in the direction of the sun/moon vector with an offset proportional to the Height Above Terrain of each point on the feature being considered.

In FIG. 9, mountain 901 is casting a shadow on the base of control tower 902, in a scene illuminated by the moon along direction m (909). Ray 903 shows the boundary of the shadow cast by the peak of mountain 901. While the base of control tower 902 is in shadow, the top should be illuminated by the moon. If light-map 904 were applied to control tower 902 by direct orthographic overlay, the entire tower would be in shadow, which is incorrect.

Consider the four points 913 along the tower: For each point on the tower, an offset is determined as follows: st'=st−$m_{xy}$*stretch*HAT/$m^2$, where stretch is a constant reflecting the size of the light-map texture, in meters, and HAT is the Height Above Terrain of each point on the feature (control tower 902). For the example below, Light-Map 904 is shown with offsets corresponding to each of the four points 913. With offsets, points 1 and 2 will be in shadow, and points 3 and 4 will be illuminated by the moon.

This approximation is optionally applied by Light-Map Texture Coordinate Generator 811. It is optional, because it requires that the HAT be known for every vertex of each feature, which may not be available. In one embodiment, if the HAT is not available for every feature in the scene, the offset approximation depicted in FIG. 9 is not employed at all, because having a mixture of features in the same area, with and without the approximation, results in discontinuities of lighting that are more disagreeable than the incorrect shadowing caused by orthographic overlay of light map 113.

For sensor simulations responsive to reflected (as opposed to absorbed and re-emitted) energy, Reflectance Calculator 120 produces texels that encode the in-band reflectance of the terrain. Castellar et al disclosed a LUT-based system for sensor simulation in U.S. Pat. No. 6,735,557, incorporated by reference herein in its entirety, that utilizes a sensor-independent encoding of Terrain Texture 100, which includes per-texel material IDs, mixture fractions, normal vectors, and static (pre-computed) shadows. For NVG and short-wave IR simulation, the present invention factors the LUT-based system of Castellar into two components, a reflectance component, and an irradiance component, by re-ordering operations without substantially modifying the method. The reflectance component is computed by Reflectance Calculator 120. The irradiance component is computed by Lighting Solver 121, and the two components are combined in Terrain Renderer 124 to produce the final terrain image.

Figure 10A:
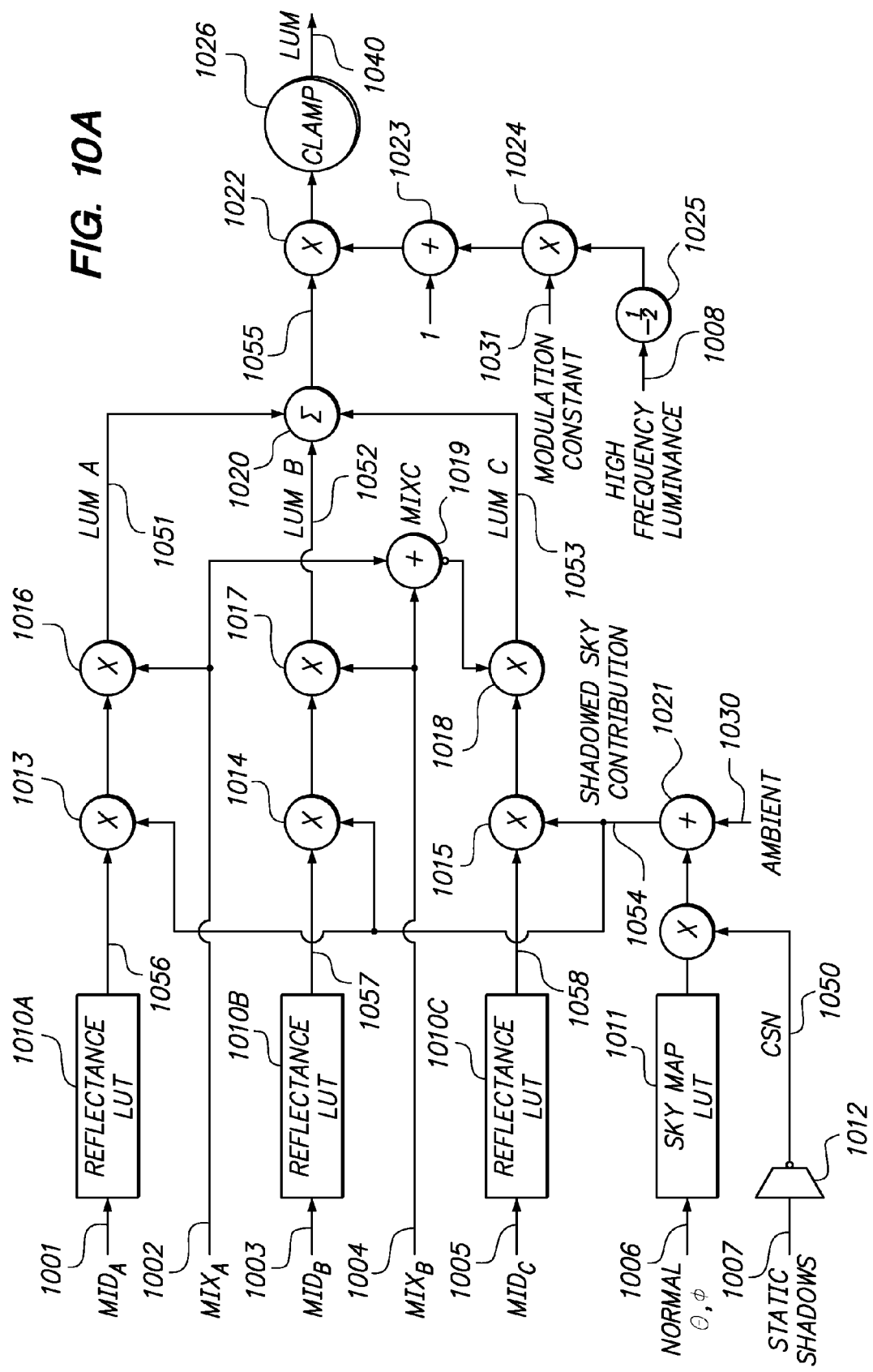
FIGS. 10a and 10b illustrate a conventional luminance generator and a luminance generator in accordance with an embodiment of the present invention.

FIG. 10a shows a LUT-based reflectance-only radiance evaluator. The various components of the Per-Texel Output Signal are shown as 1001-1008, including Material IDs, Mixtures, Normal directions, static shadows, and a High Frequency Luminance component part of the PTO per texel data structure described. Many operations are performed between application of Shadowed Sky Contribution 1054 to Sensor Modulated Reflectance values 1056-1058 and output of the Composite Per-Texel Luminance 1040. FIG. 10 includes operations 1022-1025 which are responsible for modulating the Composite Per-Texel Luminance signal by a high-frequency luminance signal.

Figure 10B:
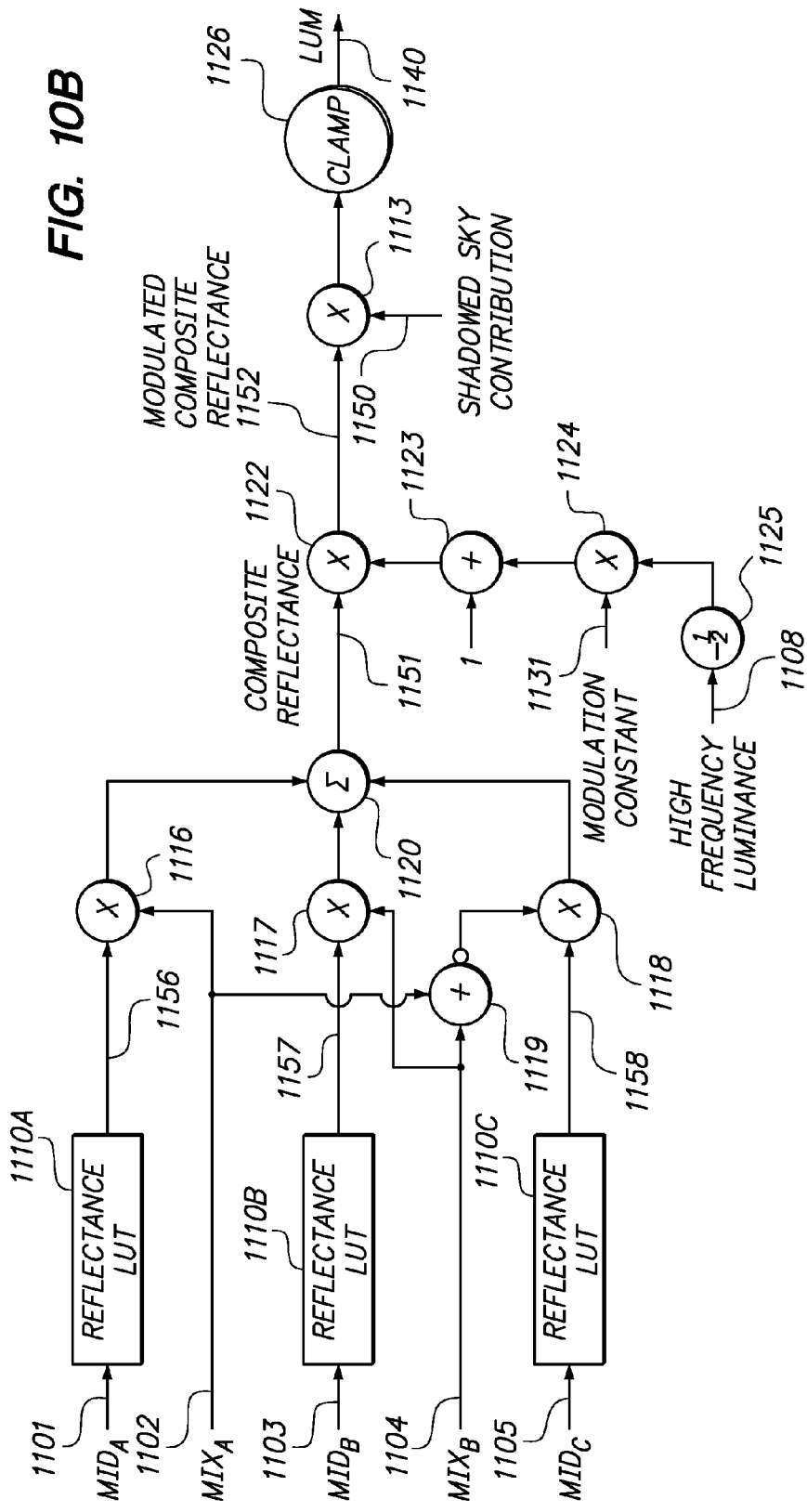

FIG. 10b illustrates a system similar to that depicted in FIG. 10a that has been factored to decouple the reflectance and irradiance components. Note that the Shadowed Sky Contribution 1150 is now the final term applied to generate Composite Per-Texel Luminance 1140. By re-ordering the data flow in such a manner, computation of irradiance may be performed separately and combined with Modulated Composite Reflectance 1152 in Terrain Renderer 124.

Note that separating the irradiance application from the processing of the PTOS has an impact on precision, and therefore storage size and required transmission bandwidth of texture 111. In FIG. 10, Composite Per-Texel Luminance 1040 is applied directly to terrain geometry, and therefore can be adequately represented at the same bit depth as DAC 224

(typically 8 bits). Much more precision (such as 32-bit fixed point or 32-bit floating point) is used to represent the intermediate values and perform the arithmetic operations used to produce the Composite Per-Texel Luminance.

In the refactored system of FIG. 11, Modulated Composite Reflectance 1152 is stored in texture 111, which is represented with additional guard bits in order to preserve the precision of the overall luminance calculation, and the Fragment Shader Unit is capable of performing Multiplication 1113 with the necessary intermediate precision. If adequate precision is not preserved, banding of displayed images may result. In one embodiment, Modulated Composite Reflectance 1152 is encoded in a 15-bit fixed-point representation, and Shadowed Sky Contribution 1150 (generated by Lighting Solver 121) is encoded in an 8-bit fixed-point representation.

These improvements are but one embodiment of the present invention, and the present invention may be applied equally well to other sensor-simulation systems capable of decoupling reflectance and irradiance.

The present invention described above efficiently solves the difficult problem of generating terrain shadows, both for the case of shadows cast from terrain onto itself, and also of shadows cast from terrain onto features. Other techniques, such as shadow mapping, shadow polygons, or shadow volumes may be used in tandem with the present invention, to add shadows cast by features onto terrain, features onto themselves, and features onto each other. These algorithms may be integrated with the present invention within Terrain Renderer 124 and Feature Renderer 123, using shadow composition techniques well known to those skilled in the art.

The described system produces high-quality illumination over large areas of terrain in both visual and sensor simulations. Shadows are computed at paging rates, which is efficient because unnecessary re-computation is eliminated. The present invention complements existing shadowing techniques such as shadow mapping, and indeed, they can be used in tandem in some embodiments.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, For example, the particular functions of the Light Source Ray Caster, Lighting Unit, Filter Unit, and so forth may be provided in many or one module. Also, reflectance and irradiance determinations may be implemented in a variety of modes, including a DSP, or any other device capable of arithmetic operations.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

We claim:

1. A computer-implemented method for determining illumination of objects over a three-dimensional environment in a visual simulation, the method comprising:

producing, by a computer, an illumination map from a raster elevation map for a first illumination area of interest;

illuminating the objects in the first illumination area of interest by applying, by the computer, the produced illumination map to the objects of the first illumination area of interest;

responsive to a change in the area of interest to a second illumination area of interest, updating, by the computer, at least a portion of the illumination map to illuminate the objects of the second illumination area of interest.

2. The method of claim 1 wherein the visual simulation is an out-the-window visual simulation, and the illumination map is generated using per-texel lighting associated with a surface normal and illumination source-incident angle.

3. The method of claim 1 wherein the visual simulation is a night vision goggles simulation, and further comprising determining for each of the objects a radiance value, the radiance value determined from an irradiance map and a reflectance map.

4. The method of claim 1 wherein the visual simulation is an infrared simulation, and further comprising determining an emissance value for each of the objects, the emissance value determined from a temperature map and black-body response coefficient.

5. The method of claim 1 wherein the objects include terrain.

6. The method of claim 1 wherein the objects include structural features.

7. The method of claim 1 wherein the objects include natural features.

8. A system for determining illumination over a three-dimensional environment, comprising:

a processor;

a lighting solver, executed by the processor, adapted to obtain a raster elevation map for a first illumination area of interest, and to produce an illumination map, and further adapted to update the produced illumination map responsive to a change in the illumination area of interest; and a three-dimensional renderer, executed by the processor and coupled to the lighting solver, adapted to apply the illumination map to objects in the three-dimensional environment.

9. The system of claim 8 wherein the objects include terrain.

10. The system of claim 8 wherein the objects include structural features.

11. The system of claim 8 wherein the objects include natural features.

12. A non-transitory computer program product for determining illumination over a three-dimensional environment, the computer program product having a non-transitory computer-readable storage medium having computer executable code comprising:

a lighting solver module, adapted to obtain a raster elevation map for a first illumination area of interest, and to produce an illumination map, and further adapted to update the produced illumination map responsive to a change in the illumination area of interest; and a three-dimensional renderer module, coupled to the lighting solver, adapted to apply the illumination map to objects in the three-dimensional environment.

13. The non-transitory computer program product of claim 12 wherein the objects include terrain.

14. The non-transitory computer program product of claim 12 wherein the objects include structural features.

15. The non-transitory computer program product of claim 12 wherein the objects include natural features.

16. The non-transitory computer program product of claim 12 wherein the illumination map includes lighting from direct sun.

17. The non-transitory computer program product of claim 12 wherein the illumination map includes lighting from a moon.

18. The non-transitory computer program product of claim 12 wherein the illumination map includes pre-computed shadows.

* * * * *